Nov. 2, 1954   H. T. WHITE   2,693,149
EXPLOSIONPROOF MOTOR-DRIVEN PUMP
Filed Sept. 13, 1950
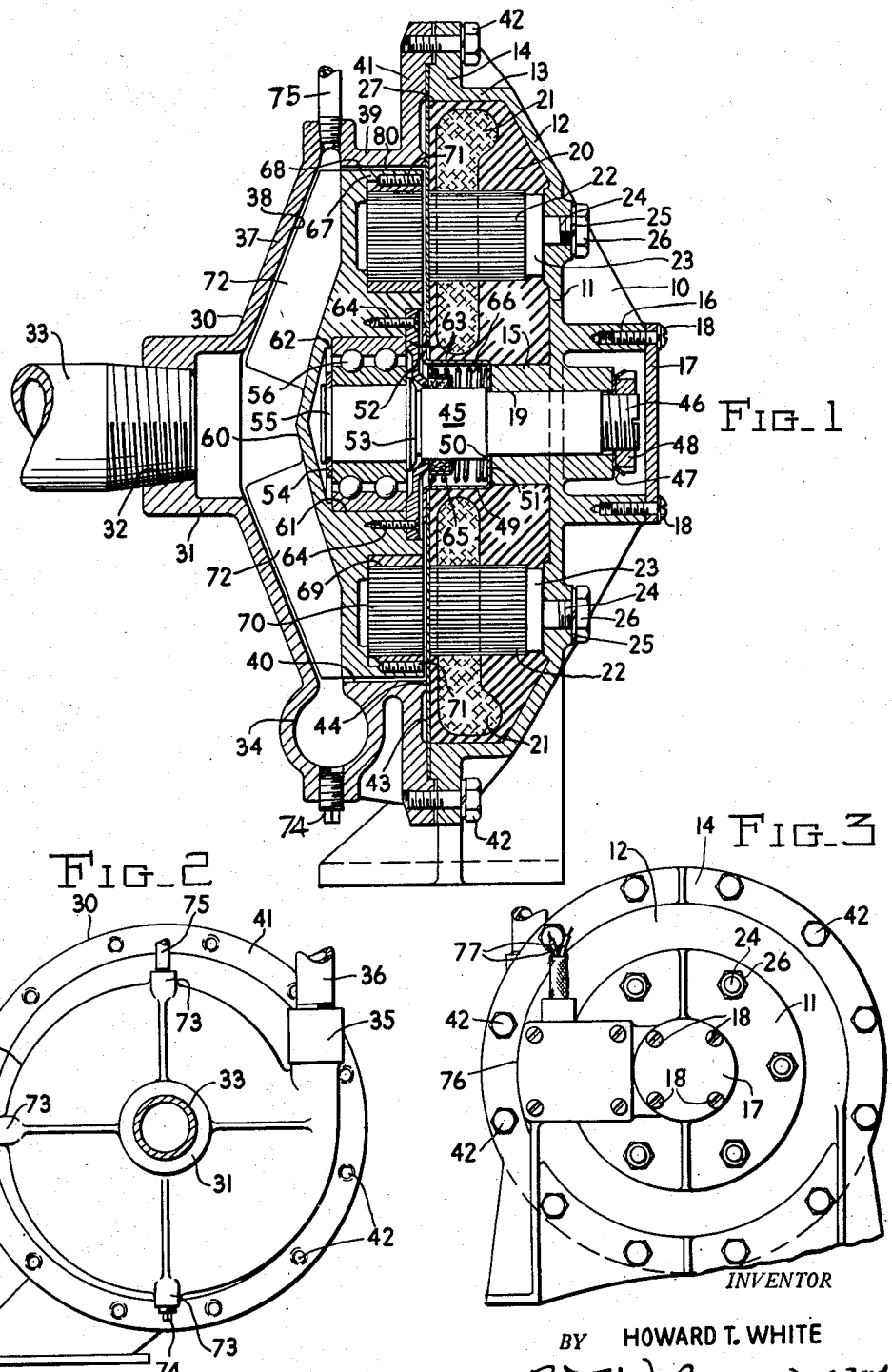
INVENTOR
BY HOWARD T. WHITE
ATTORNEY

United States Patent Office 2,693,149
Patented Nov. 2, 1954

2,693,149

EXPLOSIONPROOF MOTOR-DRIVEN PUMP

Howard T. White, Philadelphia, Pa.

Application September 13, 1950, Serial No. 184,666

13 Claims. (Cl. 103—87)

This invention relates to motor driven pumps and more particularly to a motor driven pump in which the fluid being pumped is separated from the motor stator and motor rotor in a manner to obviate any likelihood of explosion if the fluid being pumped or its vapors are of explosive character.

It is the principal object of the present invention to provide an improved motor driven pump of the type in which the motor rotor and stator are axially disposed and in which the parts are so arranged to obviate the likelihood of any explosion.

It is a further object of the present invention to provide a motor driven pump, of the character aforesaid, having an improved rotor construction.

It is a further object of the present invention to provide, in a motor driven pump of the character aforesaid, an improved arrangement of the motor rotor with respect to the housing, and to the motor stator mounted in the housing.

It is a further object of the present invention to provide a motor driven pump of the character aforesaid, in which the pump rotor may be made of any desired size, and independent of the size of the motor stator.

It is a further object of the present invention to provide a motor driven pump, of the character aforesaid, which may be employed in any desired position, horizontal, vertical, or inclined, in accordance with the installation requirements, which may be utilized as a submerged pump, and which will retain its characteristics of freedom from likelihood of explosion in whichever position it may be mounted.

Other objects and advantageous features of the invention will be apparent from the specification and claims.

The nature and characteristic features of the invention will be more readily understood from the following description taken in connection with the accompanying drawings forming part hereof, in which:

Figure 1 is a vertical central sectional view showing a preferred embodiment of the motor driven pump in accordance with the present invention.

Fig. 2 is an end elevation of the pump shown in Fig. 1, as seen from the left; and Fig. 3 is an end elevation of the pump shown in Fig. 1, as seen from the right.

It should, of course, be understood that the description and drawings herein are illustrative merely and that various modifications and changes can be made in the structure disclosed without departing from the spirit of the invention.

Like numerals refer to like parts throughout the several views.

Referring now more particularly to the drawings, in which a preferred embodiment of the invention is illustrated, the motor driven pump therein shown preferably includes a motor stator casing 10, preferably made as a unitary casting, having a radially extending plate portion 11 connected by a frusto-conical portion 12 to an axially extending portion 13 from which an outwardly disposed rim 14 extends. At the central portion of the plate 12, a hub 15 is provided, interiorly disposed, and on the outer face of the plate 12, a circular rim 16 is provided. The rim 16 is adapted to be closed at its outer edge by a plate 17 which is held in position by studs 18. The hub 15 has an interior bore 19, for purposes to be explained.

An interior space 20 is thus provided in the stator casing 10, between the hub 15 and the portion 13, which has mounted therein the stator windings 21 and laminated core 22 of an axial fluid gap alternating current electric motor of the induction type. The core 22 may be held in position by brackets 23 which have studs 24 extending through the plate 12 and with lock washers 25 and nuts 26 on the outer ends of the studs 24 for retaining the same in position. The interior space 20, after the stator windings and core have been mounted therein, is preferably filled with an insulating and waterproof sealing material which may also be of fire-resistant character, if desired, and which is adapted to distribute the heat from the core 22 over the exterior face of the sealing material. The exterior surface of the sealing material may have a diaphragm plate or cover 27 of non-magnetic responsive material extending thereover and secured thereto, although any other suitable covering or coating may be employed for the exposed face of the sealing material.

An impeller housing 30 is provided, preferably made as a unitary casting, and having a central axial inlet connection 31 at the portion thereof remote from the stator casing 10. The inlet connection 31 may, if desired, be internally threaded as at 32, for the attachment of a fluid inlet pipe 33. The impeller housing 30 is preferably provided with a scroll 34, having a tangentially disposed outlet connection 35 for the attachment of a fluid delivery pipe 36.

The housing 30 preferably has a frusto-conical portion 37, with an interior face 38, and has an outwardly disposed axially extending hollow cylindrical portion 39 with an interior face 40. The portion 39 preferably has a radially extending flange or rim 41 which is adapted to be secured to the rim 14 by a plurality of studs 42. The diaphragm plate 27 is adapted to be clamped in position and against the exterior face of the stator core and filling by the engagement of the impeller housing 30 with the motor stator casing 10, and may have cut-out portions 43 to provide an inner contacting rim 44 on the impeller housing 30 to provide a better gripping holding and sealing action.

Within the bore 19, a fixedly mounted stub shaft 45 is provided, threaded at its outer end 46 for engagement by a lock washer 47 and nut 48 and has a shoulder 50 at the inner end of the bore 19.

A sealing and retaining cup 49 is preferably provided, having an inwardly extending rim 51, with which the shoulder 50 is adapted to engage. The cup 49 has a radially outwardly extending flange 52 extending along the exterior face of the plate 27. The flange 52 is preferably not rigidly secured to the facing but is in tight engagement therewith to permit radial expansion and contraction of the plate 27.

Intermediate the shoulder 50 and the end of the stub shaft 45 opposite the threaded end 46, an outwardly extending circumferential rib 53 is provided on the shaft 45. At the outer end of the shaft 45, beyond the rib 53, a snap ring 54 is mounted in engagement in a groove 55 in the shaft 45, for clamping on the shaft 45 and in engagement with the rib 53, the inner and stationary race of a combined thrust and radial ball bearing 56.

A rotor 60 is provided in the interior of the impeller housing 30. The rotor 60 has a central axial bore 61 extending inwardly but closed at its inner end, and with an inner shoulder 62, against which the movable and outer race of the bearing 56 is adapted to be held in engagement by a clamping and sealing plate 63. The plate 63 is held in engagement with the outer race of the bearing 56 by a plurality of studs 64 extending inwardly within the body of the rotor 60 but not extending therethrough.

In the space in the interior of the cup 49, a packing 65 is provided, resiliently impelled by a spring 66 which bears thereagainst, and against the rim 51. The packing 65 is held on the shaft 45 and against the plate 63 and in sealing engagement therewith by the spring 66. The entrance of undesired fluid material into the bearing 56 is thus prevented, and the grease with which the bearing 56 is initially packed for lubrication is retained therein, free from leakage or contamination.

The rotor 60 is provided, at the periphery thereof, with an outer cylindrical portion 67 having an outer face 68 of predetermined length, and preferably with a predetermined clearance with respect to the interior face 40, as hereinafter explained.

The rotor 60 inwardly of the outerportion 67, is provided with an annular recess 69 on the face contiguous to the plate 27 in which the rotor elements 70 of the motor, for co-action with the stator core 22, are mounted. The motor rotor elements 70 are preferably held in position on the rotor 60 by screws 71 in engagement therewith. The rotor 60 has, on the side thereof opposite from the rotor elements 70, impeller blades 72 which may be of any preferred type and spaced at the desired intervals on the outer side face of the rotor 60. The blades 72 preferably have relatively close clearance with respect to the inner face 38 of the impeller housing 30.

At a plurality of predetermined locations on the scroll 34, taps 73 may be provided, closed with plugs 74 or for the connection of pipes 75 for priming or to permit the withdrawal of air or gas so that priming may be effected in whatever position the pump is disposed.

A junction box 76 may be provided on the stator housing 10 as shown in Fig. 3, for the connection of the power leads 77 for energizing the stator windings 21.

It will be noted that the rotor 60, on the fluid pumping side thereof, is uninterrupted and free from any openings therethrough in communication with the recess 69 in which the rotor elements 70 are mounted. The only access for fluid, or for gaseous constituents or vapors in or with the fluid being pumped is at the annular orifice 80 between the face 68 and the face 40. The orifice 80, at this location, provides for expansion and cooling of any ignited gaseous constituents or of any constituents under higher pressure than that of the fluid being pumped. For motors of one horsepower and under, the length of the annular orifice, shown as an axial distance, is preferably not less than one inch, and for motors over one horsepower, is at least one and one-half inches. The diametrical dimension of the orifice, or the clearance between the faces 68 and 40 with the rotor 60 at rest is of the maximum value of twenty-five thousandths of an inch, and is preferably less, with the annular orifice length indicated.

The mode of operation will, it is thought, be apparent from the foregoing, but will be summarized briefly.

With electrical energy supplied by the conductors 77 to the windings 21 of the motor stator, rotation of the rotor 60 is effected by the force applied on the motor rotor elements 70. Fluid is supplied through the fluid inlet pipe 33 to the inlet connection 31, and therefrom to the impeller blades 72 and delivered thereby to the scroll 34. From the scroll 34, the fluid is discharged through the delivery connection 35 and pipe 36.

If any gaseous vapors of explosive character should be present on the actuating side of the rotor 60, and if the heat from the rotor elements 70 or the heat emitted through the plate 27, or any other agency tended to ignite the same, the orifice 80 will serve as an effective barrier against transmission of ignited gas to the fluid pumping side of the rotor 60. The orifice 80 will by its restrictive effect, cause an expansion and cooling of the gaseous or burning material, thus effectively isolating the actuating side of the rotor 60 from the main body of fluid being pumped. The likelihood of explosion, if fluids with explosive components are being pumped, is obviated. At the same time the structure of rotor 60, and the mode of mounting of the same on the stub shaft 45, permit of ease of assembly and dis-assembly for inspection, repairs, or replacement.

I claim:

1. In a motor driven pump, a stationary housing having fluid inlet and discharge connections, a fluid impeller interposed between said connections, a rotor member in said housing having a central uninterrupted separating wall terminating in an axially extending rim, said member having the impeller mounted on one side face thereof and the motor rotor of an alternating current motor on the other side thereof and inwardly of said rim, said rim and the interior of said housing being spaced to provide a restricted expansion passageway between said sides of said rotor member, said passageway having a length of at least one inch and a total diametrical dimension not exceeding twenty-five thousandths of an inch.

2. In a motor driven pump, a stationary housing having a stator section and a rotor section, an alternating current motor in said housing, said rotor section having an inlet and a discharge, said stator section having an annular chamber in which the stator of the motor is mounted, a rotor member in said rotor section having an uninterrupted wall portion with a peripheral expansion rim, a centrifugal impeller on one side of said rotor member, the rotor of the motor being disposed on the other side of said rotor member, said rotor member being disposed in alinement with the stator and having the motor rotor spaced axially from the stator to provide an axial fluid gap therebetween, and said rim and said rotor section having a restricted orifice therebetween for isolating the motor from the impeller, said orifice having a length of at least one inch and a total diametrical dimension not exceeding twenty-five thousandths of an inch.

3. In a motor driven pump, a stationary housing having a stator section and a rotor section, an alternating current motor in said housing, said rotor section having an inlet and a discharge, said stator section having an annular chamber in which the stator of the motor is mounted, a diaphragm plate between said sections and providing a boundary of said chamber, a rotor member in said rotor section having a continuous wall portion with a centrifugal impeller on one side thereof and the rotor of the motor on the other side thereof, said wall portion having a peripheral axially extending terminal rim, said rotor being disposed in alinement with the stator and spaced axially therefrom to provide an axial fluid gap between said motor rotor and said stator and in which said diaphragm plate is disposed, said rim and said rotor section having a restricted expansion orifice therebetween for isolating the motor from the impeller, said orifice having a length of at least one inch and a total diametrical dimension not exceeding twenty-five thousandths of an inch.

4. In a motor driven pump, a stationary housing, an alternating current motor in said housing, said housing having an intake and a discharge, an annular chamber in said housing in which the stator of said motor is mounted, separator means for isolating said stator from the fluid being impelled, a centrifugal impeller mounted to rotate within the housing at one side of the stator and having an uninterrupted central radial plate portion with passages on one face thereof leading from the intake through the impeller towards its outer periphery and to said discharge, the rotor of the motor being mounted on said plate portion concentrically thereof in alinement with the stator and spaced axially therefrom to form between said rotor and said stator an axial fluid gap, and said rotor and impeller having a restricted expansion orifice therebetween for isolating the motor rotor and the impeller, said orifice having a length of at least one inch and a total diametrical dimension not exceeding twenty-five thousandths of an inch.

5. In a motor driven pump, a stationary housing, an alternating current motor in said housing, said housing having an intake and a discharge, an annular chamber in said housing in which the stator of said motor is mounted, a rotor member in said housing having an annular chamber facing said first chamber and in which the motor rotor is disposed, a centrifugal impeller operatively connected to said rotor member and having passages leading from the intake through the impeller towards its outer periphery and to said discharge, and said motor rotor being mounted concentrically of the impeller in alinement with the stator and spaced axially therefrom to form between said rotor and said stator an axial fluid gap, and said motor rotor and said impeller having a restricted expansion passageway therebetween for preventing ignition of fluid contiguous to said impeller, said passageway having a length of at least one inch and a total diametrical dimension not exceeding twenty-five thousandths of an inch.

6. In a motor driven pump, a stationary housing having a stator section and a rotor section, an alternating current motor in said housing, said rotor section having an inlet and a discharge, said stator section having an annular chamber in which the stator of the motor is mounted, a shaft mounted in said stator section and extending into the rotor section, a rotor member in said rotor section on said shaft, said rotor member having an uninterrupted wall portion with a centrifugal impeller on one side thereof and the rotor of the motor on the other side thereof, means for mounting said rotor, said rotor being disposed in alinement with the stator and spaced axially therefrom to provide an axial fluid gap between said motor rotor and said stator, and said impeller and said rotor section having a restricted expansion orifice therebetween between said motor rotor and said impeller for isolating the motor from the impeller, said orifice having a length of at least one inch and a total diametrical dimension not exceeding twenty-five thousandths of an inch.

7. In a motor driven pump, a stationary housing having fluid intake and discharge connections, a centrifugal impeller mounted to rotate within the housing and having passages leading from the intake connection through the impeller and to said discharge connection, an alternating current motor having a stator and a rotor, and driving connections between said rotor and said impeller including a dished member within which the motor laminations are disposed, said dished member having an uninterrupted wall portion terminating in an exterior portion spaced from said housing and providing therewith a restricted expansion passageway for isolating said rotor and said impeller, said passageway having a length of at least one inch and a total diametrical dimension not exceeding twenty-five thousandths of an inch.

8. In a motor driven pump, a stationary housing having fluid intake and discharge connections, a centrifugal impeller mounted to rotate within the housing and having passages leading from the intake connection through the impeller and to said discharge connection, an alternating current motor having a stator and a rotor, and driving connections between said rotor and said impeller, said driving connections including a peripheral rim spaced from said housing to provide therewith a restricted expansion passageway for isolating said rotor and said impeller, said passageway having a length of at least one inch and a total diametrical dimension not exceeding twenty-five thousandths of an inch.

9. In a motor driven pump, a stationary housing having therein an impeller space with fluid inlet and discharge connections, a rotor member in said impeller space and having a central uninterrupted portion with a centrifugal impeller disposed on one side thereof and interposed between said inlet and discharge connections, an alternating current motor in said housing and having a stator and a motor rotor alined and spaced axially to form between said rotor and said stator an axial fluid gap, said motor rotor being mounted in said rotor member on the opposite side of said central portion from said impeller, and explosion preventing means for isolating said motor rotor from said impeller comprising a restricted expansion passageway between said motor rotor and said impeller, said passageway having a length of at least one inch and a total diametrical dimension not exceeding twenty-five thousandths of an inch.

10. In a motor driven pump, a stationary housing having therein an impeller space with fluid inlet and discharge connections, a rotor member in said impeller space and having a central uninterrupted portion with a centrifugal impeller disposed on one side thereof and interposed between said inlet and discharge connections, an alternating current motor in said housing and having a stator and a motor rotor alined and spaced axially to form between said rotor and said stator an axial fluid gap, said motor rotor being mounted in said rotor member on the opposite side of said central portion from said impeller, and explosion preventing means for isolating said motor rotor from said impeller comprising a restricted expansion passageway between said rotor member and said housing, said passageway having a length of at least one inch and a total diametrical dimension not exceeding twenty-five thousandths of an inch.

11. In a motor driven pump, a stationary housing having fluid inlet and discharge connections, a fluid impeller interposed between said connections, a rotor member in said housing having said impeller mounted on one side thereof and the motor rotor of an alternating current motor on the other side thereof, and having an uninterrupted separating wall therebetween extending outwardly to said housing, a motor stator fixedly mounted in said housing, and a restricted expansion passageway between the outer margins of said wall and said housing, said passageway having a length of at least one inch and a total diametrical dimension not exceeding twenty-five thousandths of an inch.

12. In combination, a stationary housing having fluid inlet and discharge connections, a fluid impeller interposed between said connections, a rotor member in said housing having a central uninterrupted wall with an axially extending rim in spaced relation to said housing to provide therewith a restricted expansion passageway therebetween for preventing flame propagation between the side faces of said rotor member, said passageway having a length of at least one inch and a total diametrical dimension not exceeding twenty-five thousandths of an inch, said member having the impeller mounted on one side face thereof and the motor rotor of an alternating current motor on the other side face thereof.

13. In combination, a stationary housing having a stator section and a rotor section, an alternating current motor in said housing, said rotor section having an inlet and a discharge, said stator section having an annular chamber in which the stator of the motor is mounted, a rotor member in said rotor section having an uninterrupted wall portion with a peripheral rim in spaced relation to said rotor section to provide therewith a restricted passageway therebetween for preventing flame propagation between the side faces of said rotor member said passageway having a length of at least one inch and a total diametrical dimension not exceeding twenty-five thousandths of an inch, a centrifugal impeller on one side of said rotor member with which said inlet and discharge are in communication, the rotor of the motor being disposed on the other side of said rotor member, said rotor member being disposed in alignment with the stator and having the motor rotor spaced axially from the stator to provide an axial fluid gap therebetween.

References Cited in the file of this patent

UNITED STATES PATENTS

| Number | Name | Date |
|---|---|---|
| 1,405,959 | Woock | Feb. 7, 1922 |
| 2,312,848 | Pezillo | Mar. 2, 1943 |
| 2,469,808 | Aske | May 10, 1949 |
| 2,481,172 | Staggs | Sept. 6, 1950 |
| 2,534,520 | Katcher | Dec. 19, 1950 |
| 2,537,310 | Lapp | Jan. 9, 1951 |

FOREIGN PATENTS

| Number | Country | Date |
|---|---|---|
| 192,618 | Great Britain | Feb. 8, 1923 |
| 210,273 | Great Britain | Jan. 31, 1924 |